United States Patent [19]

Osborne et al.

[11] 4,037,092
[45] July 19, 1977

[54] CALCULATOR HAVING PREPROGRAMMED USER-DEFINABLE FUNCTIONS

[75] Inventors: Thomas E. Osborne, San Francisco; Richard Kent Stockwell, Palo Alto, both of Calif.

[73] Assignee: Hewlett-Packard Company, Palo Alto, Calif.

[21] Appl. No.: 419,153

[22] Filed: Nov. 26, 1973

[51] Int. Cl.² .......................................... G06F 15/02
[52] U.S. Cl. ................................................. 235/156
[58] Field of Search ............... 235/156, 159, 160, 164; 340/172.5

[56] References Cited

U.S. PATENT DOCUMENTS

| 3,588,841 | 6/1971 | Ragen | 340/172.5 |
| 3,760,171 | 9/1973 | Wang et al. | 235/156 |

Primary Examiner—David H. Malzahn
Attorney, Agent, or Firm—Patrick J. Barrett

[57] ABSTRACT

A calculator has one or more keys which initiate the performance of user-defined subroutines. When the calculator is turned on, the calculator memory is programmed with a predetermined subroutine which may subsequently be changed or replaced by the user.

6 Claims, 2 Drawing Figures

CALCULATOR HAVING PREPROGRAMMED USER-DEFINABLE FUNCTIONS

BACKGROUND AND SUMMARY OF THE INVENTION

When an electronic calculator is first turned on and power is supplied to its memory and computational circuits, it is usually necessary to clear random bits out of the memory before the calculator is ready to use. Thus, in prior art programmable calculators, a power-on or turn-on program is usually provided to clear all memory registers and insure that the calculator is ready for the first computation. Some programmable calculators have one or more keys on the keyboard which, when depressed, will initiate the performance of a subroutine which the user may define in the calculator memory. These user-definable keys provide a time saving feature for users who have frequently used subroutines comprising a number of calculator functions that require the sequential operation of a number of keys to perform. For example, the calculator keyboard may provide keys enabling the user to perform simple mathematical functions such as add, subtract, multiply, divide, square root, and so forth. A user may desire to perform a more complex function on a repeated basis such as the variance or standard deviation of data he is analyzing. User-definable keys allow the user to program these subroutines into memory and perform the desired operation on entered data with the depression of a single key. In the past it was necessary to redefine the functions associated with user-definable keys each time the calculator was turned on, since the turn-on program would clear the memory associated with the user-definable keys along with other parts of the calculator memory.

According to the preferred embodiment of the present invention, a calculator having user-definable keys is provided with a routine in its turn-on program which predefines the user-definable keys with commonly used functions. Thus, these keys are immediately usable by the user after the calculator is turned on, without having to program the memory associated with the keys. However, if the user desires to have other functions associated with the user-definable keys he may reprogram the keys with as much ease as user-definable keys were programmed in prior art calculators. The user-definable keys may be predefined with functions normally accessible from the keyboard or with functions that are stored in a read-only memory or other hardware in the calculator, but are not normally accessible from the keyboard.

DESCRIPTION OF THE PREFERRED EMBODIMENT

Figure 1:
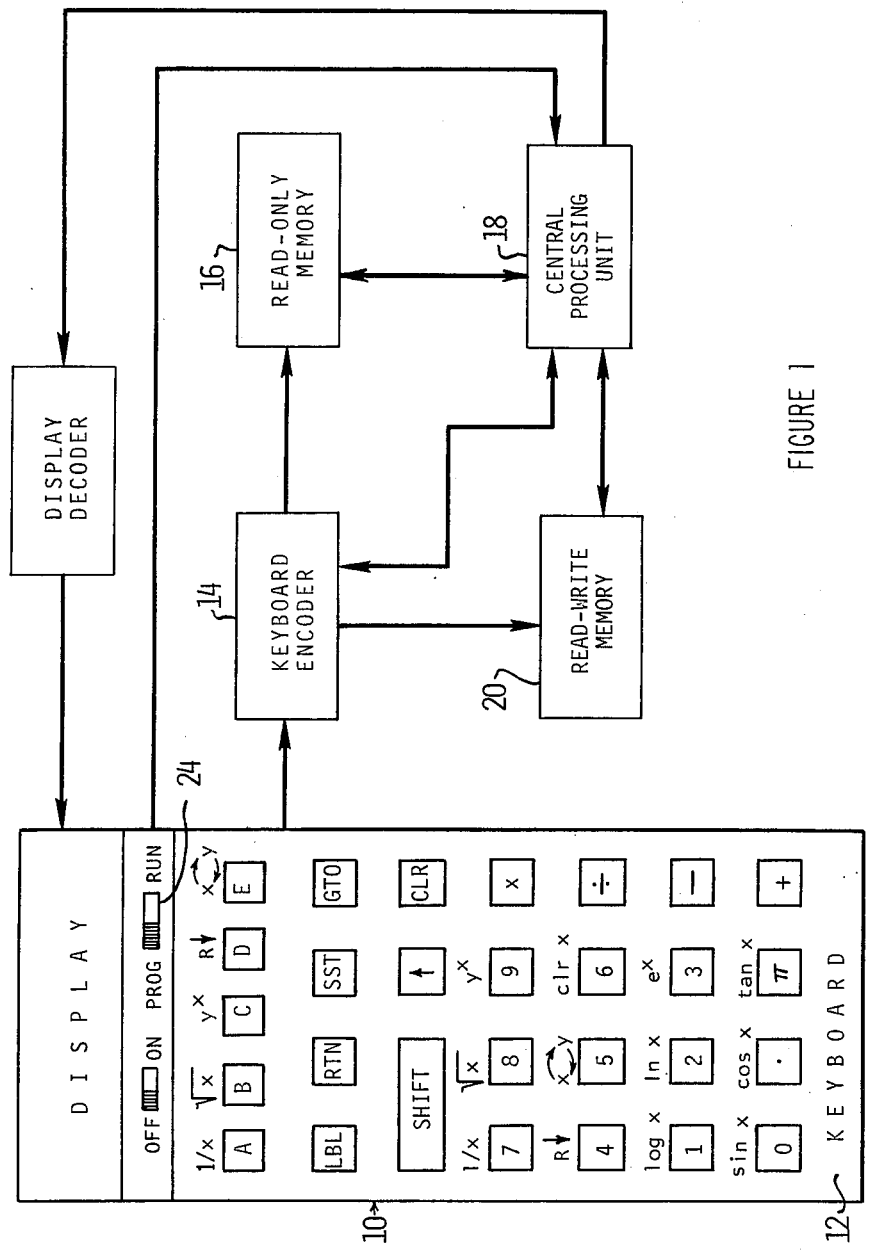
FIG. 1 shows a block diagram of an electronic calculator according to the preferred embodiment of the present invention.

FIG. 1 illustrates the block diagram of a programmable electronic calculator 10 with a keyboard 12 having a plurality of keys for initiating the performance of various computational and manipulative operations. The keyboard is connected to keyboard encoder 14 which generates various key codes in response to the depression of the various keys on the keyboard. For example, a two-digit octal number may be associated with each key on the keyboard and the encoder will generate a six digit binary number in response to the depression of each key. The keyboard and the keyboard encoder may be implemented, for example, with an array of single pole, single throw switches, each switch corresponding to a key and a common diode encoding matrix connected to the keys. Keyboard encoder 14 is connected to a read-only memory 16 and a central processing unit (CPU) 18. ROM 16 contains instructions in binary form corresponding to the various key codes generated from the keyboard 12. CPU 18 responds to the instructions from ROM 16 to perform various mathematical calculations and manipulative operations on data entered from the keyboard. The operation of such ROM and CPU along with a keyboard and other calculator circuits is described in detail in a patent application by Francé Rodé, et al. entitled "Improved Business Calculator" Ser. No. 302,371, filed Oct. 30, 1972, now U.S. Pat. No. 3,863,060, and also in the Hewlett-Packard Journal June 1, 1972, pages 1-9.

Calculator 10 also includes a read-write memory 20 which is connected to keyboard encoder 14 and central processing unit 18. Read-write memory 20 may be used for storing information entered from the keyboard or from auxiliary devices such as a magnetic card reader. The key codes stored in read-write memory 20 are data and various mathematical manipulative operations stored in coded form for later use as a program or subroutine for performing calculations with data entered from the keyboard. In order to store a program in the read-write memory the calculator must be preconditioned to store rather than execute the key codes as they are generated. Thus, a Program/run switch 24 is connected to CPU 18 to select the mode of operation of the calculator.

In the Run mode, a key code from keyboard encoder 14 is directed by CPU 18 to establish an address in ROM 16 which, in turn, causes the CPU to execute the instructions stored in ROM 16 at that address. When the calculator is in the Program mode, the key codes are stored in memory 20 for later use instead of being executed. Memory 20 may be any one of several common types of read-write memories such as a delay line, a shift register or an array of magnetic cores.

User-definable keys A through E on the keyboard 12 may be used for initiating subroutines stored in read-write memory 20. As mentioned before, the subroutines may be entered from the keyboard and this will be illustrated with a program for computing the ratio of two numbers that have been entered from the keyboard and giving the answer in percent. After the calculator has been placed in the Program mode by moving switch 24 to the left, the following keys would be depressed:

LBL
A
÷
1
0
0
X
RTN

The first key depressed, LBL, is a memory instruction that denotes the beginning of the user-definable function that will correspond to the user-definable key depressed, here key A. When the calculator is later instructed to find user-definable function A, it will look for the notation LBL A in memory and then execute the following program steps. Data from the keyboard of the calculator is entered into an operational stack and the data in the bottom two positions will be divided in the next program step. Following that, new data, the number 100, will be entered and the result of the previous division will be pushed up to the next position in the stack. Next the numbers in the two bottom positions of the stack will be multiplied yielding the answer in percent. The last instruction, RTN, tells the calculator that the subroutine is finished and that the calculator should return to the manual operational mode. The calculator will perform this subroutine when it is placed in the Run mode by moving switch 24 to the right and key A is depressed.

In the preferred embodiment, the calculator uses a dynamic memory implemented in shift registers. Each piece of information in such a memory is located relative to other pieces of information but has no absolute address as it would in a core type memory. A memory pointer is used as an index to indicate that word in memory that is currently accessible. When information is read from memory, the memory will start the read-out at the memory pointer and then move to each successive memory word until told to stop, at which time the memory pointer will then point to the word where read out stopped. The memory pointer can also be commanded to move to any particular word in memory or to find a particular word in memory identified by a particular LBL.

When the calculator is in the Run mode and key A is depressed, the memory pointer will first be moved to the memory position immediately after LBL A. Next, the calculator will execute all instructions until it encounters a RTN instruction, when it will stop and display the results. The memory pointer will then remain at the RTN instruction until further instruction is given. A more detailed disclosure of the operation of user-definable keys along with an exemplary implementing structure may be found in U.S. Patent application by Robert E. Watson, entitled "Improved Programmable Calculator," Ser. No. 153,437 filed June 15, 1971, now U.S. Pat. No. 3,859,635.

As mentioned previously, prior art calculators having user-definable keys have no usable functions associated with these keys after the machine is turned on until the keys are programmed by the user, either from the keyboard or by the use of some auxiliary programming device such as a magnetic card. Since the calcuator may have more than one user-definable key and the user may desire only one or two programs of his own, some of the keys may thus remain unprogrammed and unused. It is thus highly advantageous to have the user-definable function keys programmed with commonly used functions when the calculator is turned on, so that the user may use these if he does not desire to reprogram the calcuator with his own subroutines. It may be desirable for example, to preprogram user-definable keys with functions that are accessible from the keyboard but that require more than a single key stroke to initiate.

As illustrated in FIG. 1, in some calculators the user must actuate a shift key before certain functions can be initiated such as 1/X, X½, Y$^x$ and so forth. These functions are associated with the keys that are normally used for entering numbers; thus, when the 7 key is depressed the 7 is entered into memory. However, when the shift key is depressed and then the 7 key is depressed the calculator will take the inverse of the number in the bottom register of the memory stack. In the illustrated embodiment the functions 1/X, X½, Y$^x$, roll stack door (R ↓) and exchange X and Y (X⇌Y) are shown associated with the user-definable function keys A through E, so that those functions, which normally require the use of the shift key, may be initiated with a single key stroke. When the calculator is turned on, the memory is automatically programmed to associate those functions with keys A through E; but the user has the option of reprogramming the memory so that those keys will initiate whatever subroutine the user wishes.

Figure 2:
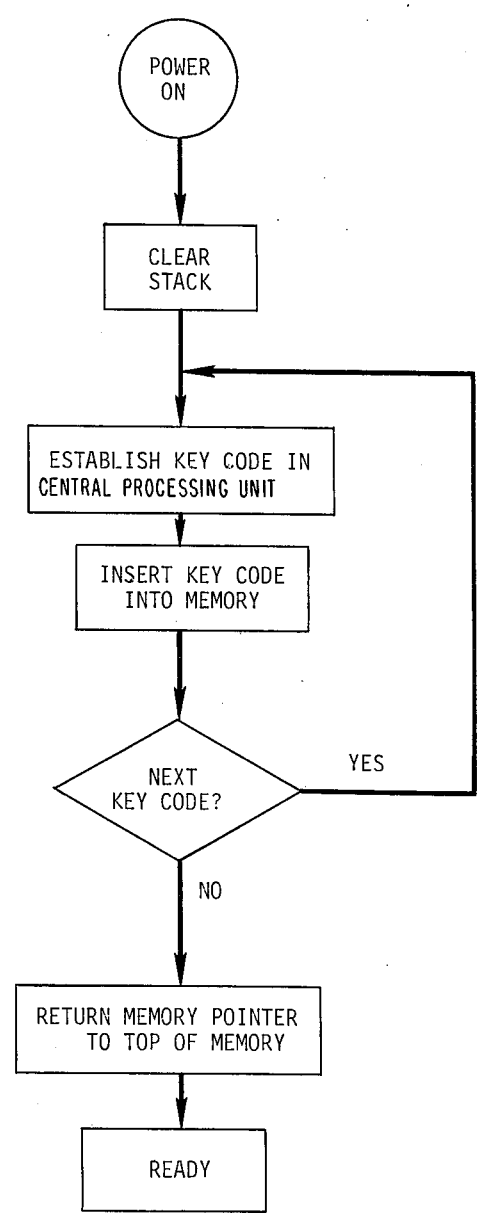
FIG. 2 shows a flow diagram for preprogramming user-definable keys in the calculator shown in FIG. 1.

The memory can be preprogrammed with the aforementioned functions using a program in the turn-on sequence illustrated by the flow diagram in FIG. 2. This subroutine is programmed into a portion of ROM 16 in the form of the sequence of steps or key codes to be programmed into memory 20. The programmed sequence for the illustrated embodiment is as follows:

Table I

LBL
A
Shift
7 (1/X)
RTN
LBL
B
Shift
8 (√x)
RTN
LBL
C
Shift
9 (y$^x$)
RTN
LBL
D
Shift
4(R ↓)
RTN
LBL
E
Shift
5(X ⇌ Y)
RTN This same turn on programming sequence could also be used to program one or more of keys A through E with functions that are not ordinarily accessible from the keyboard such as cube root, for example, which does not appear on the illustrated keyboard. Because memory 20 is not divided up into discrete areas corresponding to each of the keys, a function corresponding to a user-definable key may be as short as one step or as long as the whole memory. It will be understood, of course, that another type of memory could be used in which each key A through E corresponded to a particular fixed address or series of addresses in memory.

The foregoing programming sequence and the flow chart in FIG. 2 can be implemented in a ROM using the bit pattern and programming steps shown in Table II, below. This ROM program writes the same set of subroutines into memory 20 that would be written if the sequence shown in Table I were entered from the keyboard. Thus the information stored in the key codes that establish addresses in other ROM's such as those disclosed in the aforementioned U.S. Pat. No. 3,863,060 for performing mathematical functions when the user-definable keys are depressed.

Table II

| 0 | L12010: | ...1111111 | → L2037 | G | : GO TO DFLT0 |

Table II-continued

| # | Label | Bits | Jump | Mnemonic | | Description |
|---|---|---|---|---|---|---|
| 1 | L12011: | 1.1...... | | RSETP | : | SEARCH FOR LABEL |
| 2 | L12012: | ..1....111 | → L2041 | | | GO TO DFLT3 |
| 3 | L12015: | ...1111111 | → L2037 | RDN | : | GO TO DFLT0 |
| 4 | L12016: | ...1111111 | → L2037 | F | : | GO TO DFLT0 |
| 5 | L12021: | ...1111111 | → L2037 | EXCG | : | GO TO DFLT0 |
| 6 | L12022: | ......... | | | | NO OPERATION |
| 8 | L12023: | ...1111111 | → L2037 | YTX | : | GO TO DFLT0 |
| | L12024: | ...1111111 | → L2037 | INX | : | GO TO DFLT0 |
| 9 | L12030: | ...1111111 | → L2037 | E | : | GO TO DFLT0 |
| 10 | L12032: | ...1111111 | → L2037 | D | : | GO TO DFLT0 |
| 11 | L12033: | ...1111111 | → L2037 | C | : | GO TO DFLT0 |
| 12 | L12034: | ...1111111 | → L2037 | B | : | GO TO DFLT0 |
| 13 | L12036: | ...1111111 | → L2037 | A | : | GO TO DFLT0 |
| 14 | L12037: | ..1....... | | DFLT0 | : | MEMORY INSERT |
| 15 | L12040: | 111.1..... | | | | 1 → F7 |
| 16 | L12041: | 1.111..1.. | | DFLT3 | : | 0 → S11 |
| 17 | L12042: | 1.111..... | | DFLT1 | : | 0 → F5 |
| 18 | L12043: | 1.11.1.1.. | | | | IF S11 No. 1 |
| 19 | L12044: | ..1...1.11 | → L2042 | | | THEN GO TO DFLT1 |
| 20 | L12045: | 1.111..... | | | | 0 → F5 |
| 21 | L12046: | ....11..... | | | | RETURN |
| 22 | L12052: | ...1111111 | → L2037 | RTN | : | GO TO DFLT0 |
| 23 | L12053: | ...1111111 | → L2037 | LBL | : | GO TO DFLT0 |
| 24 | L12062: | ...1111111 | → L2037 | SQT | : | GO TO DFLT0 |
| 25 | L12303: | 111.1.1... | | | | CLEAR REGISTERS |
| 26 | L12304: | .1..1..... | | | | 1 → F2 |
| 27 | L12305: | .11.1..... | | | | 1 → F3 |
| 28 | L12306: | ...11.1... | | | | CLEAR STATUS |
| 29 | L12307: | ..1...11.. | | | | 2 → P |
| 30 | L12310: | ..1..11... | | | | LOAD CONSTANT 2 |
| 31 | L12311: | ..1..11... | | | | LOAD CONSTANT 2 |
| 32 | L12312: | ...1..11... | | | | LOAD CONSTANT 1 |
| 33 | L12313: | 1.111..... | | | | 0 → F5 |
| 34 | L12314: | 111.1..... | | | | 1 → F7 |
| 35 | L12315: | ..1.1.11.1 | → L2053 | | | JSB LBL |
| 36 | L12316: | ...1111..1 | → L2036 | | | JSB A |
| 37 | L12317: | ....1....1 | → L2010 | | | JSB G |
| 38 | L12320 | ...1.1....1 | → L2024 | | | JSB INX |
| 39 | L12321: | ..1.1..1.. | → L2052 | | | JSB RTN |
| 40 | L12322: | ..1.1.11.1 | → L2053 | | | JSB LBL |
| 41 | L12323: | ...111...1 | → L2034 | | | JSB B |
| 42 | L12324: | ....111..1 | → L2016 | | | JSB F |
| 43 | L12325: | ..11..1..1 | → L2062 | | | JSB SQT |
| 44 | L12326: | ..1.1.1..1 | → L2052 | | | JSB RTN |
| 45 | L12327: | ..1.1.11.1 | → L2053 | | | JSB LBL |
| 46 | L12330: | ...11.11.1 | → L2033 | | | JSB C |
| 47 | L12331: | ....1....1 | → L2010 | | | JSB G |
| 48 | L12332: | ...1..11.1 | → L2023 | | | JSB YTX |
| 49 | L12333: | ..1.1..1.. | → L2052 | | | JSB RTN |
| 50 | L12334: | ..1.1.11.1 | → L2053 | | | JSB LBL |
| 51 | L12335: | ...11.1..1 | → L2032 | | | JSB D |
| 52 | L12336: | ....11.1.1 | → L2015 | | | JSB RDN |
| 53 | L12337: | ..1.1..1.. | → L2052 | | | JSB RTN |
| 54 | L12340: | ..1.1.11.1 | → L2053 | | | JSB LBL |
| 55 | L12341: | ...11...1 | → L2030 | | | JSB E |
| 56 | L12342: | ...1....1.1 | → L2021 | | | JSB EXCG |
| 57 | L12343: | ..1.1..1.. | → L2052 | | | JSB RTN |
| 58 | L12344: | ....1..1.1 | → L2011 | | | JSB RSETP |
| 59 | L12345: | 111.1.1..1 | → L2352 | | | JSB CLRC0 |
| 60 | L12352: | 11.....11.. | | CLRC0 | : | 12 → P |
| 61 | L12353: | ....1.111.. | | CLRC1 | : | 0 → B[W] |
| 62 | L12354: | 1....1.111. | | | | B EXCHANGE C[W] |
| 63 | L12355: | ....11..... | | | | RETURN |

As an alternative to the above-disclosed method, memory 20 could also be preprogrammed by constructing a read-write memory with a read-only memory within it or by configuring the memory elements so that they turn on in a preferential state, i.e. 1 or 0. One type of memory that could be suitable for such a use is suggested in an IBM Technical Disclosure Bulletin, Volume 14, No. 9, February 1972, pages 2601-2.

We claim:

1. A calculator having electronic circuits comprising:
a keyboard having a plurality of keys including a user-definable function key;
encoder means connected to the keyboard for generating a plurality of coded signals representing manipulative functions and alphanumeric characters including those functions and characters corresponding to the keys in the keyboard;
a read-write memory connected to the encoder means for storing coded signals;
computing means connected to the encoder means and the read-write memory for processing coded signals stored in the read-write memory in response to a predetermined coded signal corresponding to the user-definable function key;
power means connected to the electronic circuits including the encoder means, the read-write memory and the computing means for causing electrical power to be applied to the electronic circuits; and
preprogram means connected to the read-write memory and the power means for establishing, in response to the application of power to the electronic circuits, a program of one or more coded signals in the read-write memory that can be processed in the computing means in response to the generation of the predetermined coded signal.

2. A calculator as in claim 1 wherein the program of coded signals stored in the read-write memory may be replaced with other coded signals by actuation of keys on the keyboard.

3. A calculator as in claim 2 wherein the program of coded signals represents a numerical constant.

4. A calculator as in claim 2 wherein:
   the keyboard includes a manipulative function key having a corresponding first coded signal for causing the computing means to perform a first manipulative function;
   the keyboard includes a shift key having a corresponding second coded signal for causing the computing means to perform a second manipulative function in response to receipt of the first coded signal subsequent to receipt of the second coded signal by the computing means; and
   the program of coded signals includes the second and then the first coded signals.

5. A calculator as in claim 1 further comprising switch means connected to the computing means for setting the calculator in a program mode in a first position and a run mode in second position, the first position enabling establishment of another program of one or more coded signals in the read-write memory in response to actuation of keys on the keyboard, and the second position enabling processing of coded signals by the computing means in response to actuation of keys on the keyboard.

6. A calculator as in claim 5 wherein the preprogram means includes a read-only memory containing the program of one or more coded signals for transferring the coded signals to and establishing the coded signals in the read-write memory in response to the application of power to the electronic circuits, independent of the position of the swich means.

* * * * *

UNITED STATES PATENT AND TRADEMARK OFFICE
CERTIFICATE OF CORRECTION

PATENT NO. : 4,037,092
DATED : 7/19/77
INVENTOR(S) : Thomas E. Osborne, Richard Kent Stockwell It is certified that error appears in the above-identified patent and that said Letters Patent are hereby corrected as shown below:

Column 3, line 49, "calcuator" should read --calculator--;

line 63, "X 1/2" should read --$X^{1/2}$--;

Column 4, line 5, "X 1/2" should read --$X^{1/2}$--;

line 5, "door" should read --down--.

Signed and Sealed this

Twenty-second Day of November 1977

[SEAL]

Attest:

RUTH C. MASON
Attesting Officer

LUTRELLE F. PARKER
Acting Commissioner of Patents and Trademarks